(12) United States Patent
Hagenaars

(10) Patent No.: US 6,182,093 B1
(45) Date of Patent: Jan. 30, 2001

(54) MANAGEMENT OF MULTIMEDIA INFORMATION ACROSS A PLURALITY OF HTML CONTAINERS

(75) Inventor: Harald H. J. Hagenaars, Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/031,694

(22) Filed: Feb. 27, 1998

(30) Foreign Application Priority Data

Mar. 3, 1997 (EP) .................................................. 97200612

(51) Int. Cl.[7] ...................................................... G06F 17/30
(52) U.S. Cl. ........................ 707/513; 707/501; 707/102; 707/104
(58) Field of Search ................................. 709/203, 212, 709/217, 218, 231, 232, 305, 304, 302–303; 707/1–10, 100–104, 200–205, 500–501, 511, 513–514, 900–907; 395/701, 709–710, 712; 717/1–11

(56) References Cited

U.S. PATENT DOCUMENTS

| | | | |
|---|---|---|---|
| 5,727,950 | * 3/1998 | Cook et al. | 434/350 |
| 5,835,712 | * 11/1998 | DuFresne | 709/203 |
| 5,862,325 | * 1/1999 | Reed et al. | 709/201 |
| 5,916,310 | * 6/1999 | McCain | 710/67 |
| 5,918,010 | * 6/1999 | Appleman et al. | 709/203 |
| 5,920,696 | * 7/1999 | Brandt et al. | 709/218 |
| 5,943,496 | * 8/1999 | Li et al. | 395/709 |

OTHER PUBLICATIONS

Mastering C++, Vol., 1991, Cay S. Horstmann, An Introduction to C++ and Object–orientated Programming for C and Pascal Programmers: p. 208– p. 226.

* cited by examiner

*Primary Examiner*—John Breene
*Assistant Examiner*—Srirama Channavajjala
(74) *Attorney, Agent, or Firm*—Gregory L. Thorne

(57) ABSTRACT

A method and apparatus for use in a multimedia environment for executing management of one or more global information entities across a plurality of HTML containers. An additional GLOBAL.HTML container is provided for therein carrying out such management in a predetermined script language, the additional container being at a predetermined fixed location in the memory of the apparatus.

5 Claims, 1 Drawing Sheet

MANAGEMENT OF MULTIMEDIA INFORMATION ACROSS A PLURALITY OF HTML CONTAINERS

BACKGROUND OF THE INVENTION

The invention relates to a method for use in a multimedia environment for managing one or more global information entities across a plurality of HTML containers. In the environment of Internet, one of several protocols used for producing documents is the HyperText Markup Language (HTML). An exemplary and lucid introduction to this language is the information called HTMLPRIMER.HTML, pages 1–16, provided by the National Center for Supercomputing Applications, that is emailable under pubs@ncsa.uiuc.edu. Multimedia and other interactive applications may be implemented either through HTML, or through using a VISUAL BASIC script (VBscript) that is located within a so-called container, or through a mixture of the two. Note that each file forms a separate container. In consequence, a particular application may be built up from an appreciable number of HTML documents, one or more thereof containing code expressed in a language such as VBScript or JAVAscript. Now, according to a first policy, a particular variable, function, or procedure may be declared within a single HTML container in a local manner, so that the so-defined item is valid only within the container in question. Such entities may then be accessed exclusively from the Procedure or Function wherein the entity in question has been defined. According to a second policy, such entity may be defined in a global manner, that is valid across various different such containers, but the entity in question can still be accessed exclusively from the container which comprises the declaration of that entity. The latter would often imply a recursive series of calls through a tree structure of several containers. In particular, the so-called zero frame has not yet been documented.

SUMMARY OF THE INVENTION

Now therefore, amongst other things a need has been recognized to be able to manage such global entities across multiple HTML containers without the necessity to always first explicitly return to the container that holds the associated declaratory statement. The latter container could in principle be one of an appreciable number which at any time may be active in an application. In consequence, according to one of its aspects, the invention provides an additional GLOBAL.HTML container for therein executing said managing within a predetermined script language. The one extra container does not overly complicate the structure of the application in question, whilst the uniform jumping to a standard container will be felt by a user as only a small additional burden. Note that this standard container would always be located at a fixed location in memory that is known in advance, and therefore, the accessing thereof can be rendered implicit. Moreover, it will be known automatically that a particular item is an item defined in a global manner.

The invention also relates to a system for implementing the method as recited.

BRIEF DESCRIPTION OF THE DRAWINGS

These and further aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Figure 1:
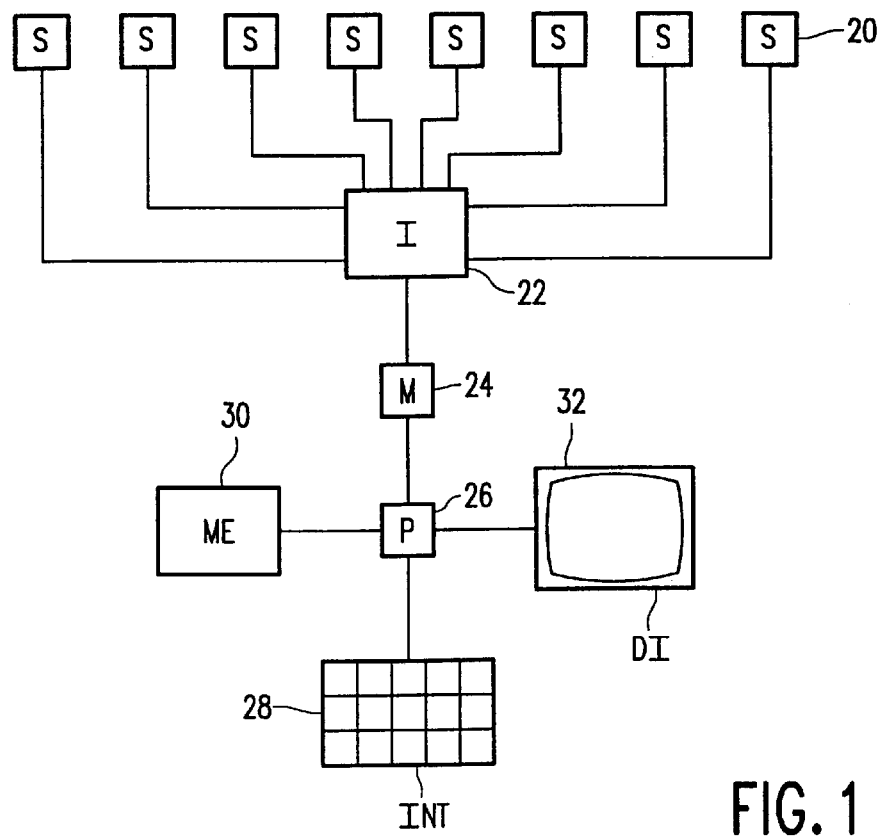
FIG. 1, a block diagram of the invention's environment.

FIG. 1 is a block diagram of the invention's environment. Block 22 symbolizes the Internet or similar structure that links a plurality of remote sites 20, which may be embodied either in hardware or in software, to local modem 24. The local station furthermore contains processing facility 26, memory facility 30, display facility 32, and user interface facility 28. Generally, the I/O structure may be structured more intricately than the minimal configuration shown. Local memory 30 may accommodate a plurality of applications, that may be fetched from Internet and subsequently rendered simultaneously accessible through visualizing on display facility 32. Such application may imply the consulting of an information structure, the amending of such structure for local use, interrelating various such structures for creating a higher level of information, or after the above amending, altering the content of a site accordingly.

Figure 2:
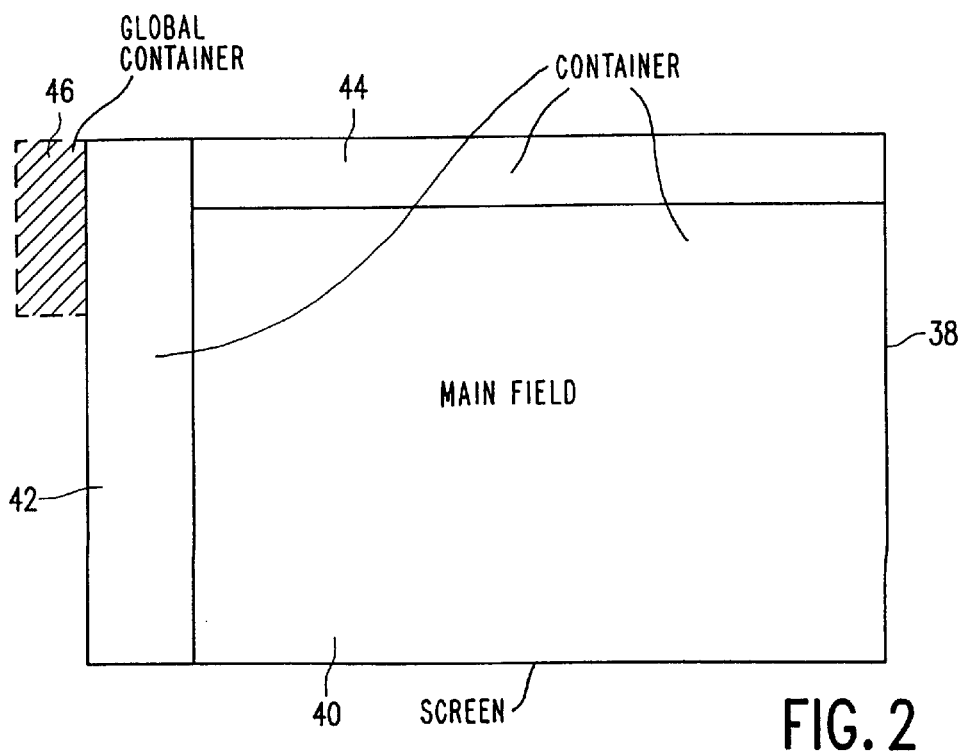
FIG. 2, a screen diagram of a multicontainer application.

FIG. 2 is a screen diagram of a multicontainer application. The hardware pertaining to the screen has not been given in detail. As shown herein, three different containers have been visualized as strip 42, strip 44, and main field 40, respectively. For brevity, the displayed content of these containers has not been detailed further. These containers may be collectively associated with only a single application or with various different applications in parallel. Each such container field may display various information items, such as variables, functions or procedures, in addition to various fixed items. Here, a variable is generally an attribute of a fixed item, such as the size of a frame, or the colour of a displayed entity. A function may be a particular prescription for influencing such attribute value. A procedure may be a prescription for executing a particular operation, such as an action on a particular global file; normally, the result of such action is not displayed, but remains out of the graphic display realm.

Generally, the measures as proposed comprise the defining and generating of a specific document GLOBAL.HTML for therein storing global entities such as variables, functions, and procedures. This generating occurs at the time when the application is created. Inasmuch as the items in an application are exclusively used in containers that may be made visible on the screen anyway, the document or container GLOBAL.HTML is not displayed in the format of FIG. 2. Inasmuch as it is nevertheless continually accessible, it has been shown outside the screen 38 in a hatched manner 46. An exchanging of the displayed frames with others will not amend the global container, that will remain immediately accessible as long as the application is running. Advantages of the procedure according to the invention are that the syntax of languages such as VBScript or JAVAscript need not be amended, application developers are not expressly required to use such file, permanent compatibility with pre-existing Internet VBScript or JAVAscript applications is guaranteed, and finally, reusability of procedures that are used often, and further a correct management of global entities are attained.

The file GLOBAL.HTML may, for example, look as follows:

```
<SCRIPT LANGUAGE="VBScript">
<!---
Dim Variable1, Variable2
Dim Array1[10]
Sub PlayMovie
Movie 1.Play
Image1.Zorder=0
End Sub
Function CalculateGraph (InputParameter as Variant)
...
End Function
</SCRIPT>
```

In the above format, the indications <SCRIPT . . . > and </SCRIPT> are the delimiters of the container, the header delimiter furthermore defining the LANGUAGE actually used. Variables are declared through a start with Dim, and separated through a comma. Various types of variable will each require their respective Dim starter. Functions are declared through a start with Function and terminated through a terminator End Function. Procedures are declared through a start with Sub and terminated through terminator End Sub. For the example, only a minimal configuration of the GLOBAL.HTML container has been shown, as well as only a rudimentary format of the Procedure and Function entities. Upon starting the application, the container is stored at a predetermined address location relative to the memory area made available to the application in question.

In this example, the following entities are now defined as being global for the whole application: Variable1, Variable2, Array1, Procedure PlayMovie, and Function CalculateGraph. Upon starting the application, the file in question will be loaded into memory at a fixed location that is known in advance. An application may access this memory location when wishing to manipulate any of the global entities. The nature of the application proper has not been discussed further for reasons of brevity.

What is claimed is:

1. A method for use in a multimedia environment for managing at least one global information entity across a plurality of HTML containers; said method comprising:

providing an additional GLOBAL.HTML container for therein executing management of said at least one global information entity wherein said additional GLOBAL.HTML container is separate from said plurality of HTML containers and said additional GLOBAL.HTML container may be accessed without requiring access of a particular one of said plurality of HTML containers; and executing said management in a predetermined script language.

2. A method as claimed in claim 1, wherein said script language is either of Visual Basic script (VB script) or JAVA script.

3. Apparatus for executing a multimedia application requiring management of at least one global information entity across a plurality of HTML containers; said apparatus comprising:

accessing means for accessing an additional GLOBAL.HTML container for carrying out management of said at least one global information entity in a predetermined script language; and a memory wherein said additional container is loaded at a predetermined fixed location therein before execution of said multimedia application is commenced.

4. A method for use in a multimedia environment for managing at least one global information entity across a plurality of HTML containers; said method comprising:

providing an global container for therein executing management of said at least one global information entity wherein the contents of said global container are fixed during execution of said plurality of HTML containers; and executing said management in a predetermined script language.

5. The method of claim 4, comprising defining a fixed memory location for said global container prior to execution of said plurality of HTML containers.

* * * * *